(12) United States Patent
Hibino et al.

(10) Patent No.: US 8,361,666 B2
(45) Date of Patent: Jan. 29, 2013

(54) FUEL CELL APPARATUS, VEHICLE INCLUDING THE FUEL CELL APPARATUS, AND POWER MANAGEMENT METHOD FOR A SYSTEM EQUIPPED WITH FUEL CELL UNIT

(75) Inventors: Masahiko Hibino, Toyota (JP); Kazunori Shibata, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1241 days.

(21) Appl. No.: 11/920,449

(22) PCT Filed: Jun. 19, 2006

(86) PCT No.: PCT/IB2006/001704
§ 371 (c)(1),
(2), (4) Date: Nov. 15, 2007

(87) PCT Pub. No.: WO2006/136934
PCT Pub. Date: Dec. 28, 2006

(65) Prior Publication Data
US 2009/0029197 A1 Jan. 29, 2009

(30) Foreign Application Priority Data
Jun. 21, 2005 (JP) .................... 2005-181223

(51) Int. Cl.
*H01M 8/00* (2006.01)
*H01M 8/04* (2006.01)

(52) U.S. Cl. .................. 429/432; 429/430; 429/431

(58) Field of Classification Search .................. 429/430, 429/431, 432; 180/65.1
See application file for complete search history.

(56) References Cited

U.S. PATENT DOCUMENTS

| | | | |
|---|---|---|---|
| 6,093,500 A | 7/2000 | Margiott et al. | |
| 6,187,464 B1 * | 2/2001 | Yasumoto et al. | 429/413 |
| 2004/0137292 A1 * | 7/2004 | Takebe et al. | 429/23 |
| 2004/0224192 A1 | 11/2004 | Pearson | |
| 2005/0136293 A1 | 6/2005 | Baker | |
| 2006/0147770 A1 | 7/2006 | Krause | |
| 2007/0009773 A1 * | 1/2007 | Xie | 429/13 |

FOREIGN PATENT DOCUMENTS

| | | |
|---|---|---|
| DE | 101 04 569 A1 | 8/2001 |
| DE | 101 25 106 A1 | 12/2002 |
| EP | 1 231 092 A1 | 8/2002 |
| JP | 63-098710 A | 4/1988 |
| JP | 2621435 | 11/1988 |

(Continued)

OTHER PUBLICATIONS

German Office Action issued Apr. 30, 2009 of DE 11 2006 001 469.2 and English translation thereof.

*Primary Examiner* — Ula C Ruddock
*Assistant Examiner* — Frank Chernow
(74) *Attorney, Agent, or Firm* — Kenyon & Kenyon LLP

(57) ABSTRACT

Variation of the amount of power to be produced by a fuel cell unit is limited in accordance with a relationship between an output voltage of the full cell unit and an oxidization-reduction potential of catalyst of a fuel cell of the fuel cell unit. The amount of power to be used to charge or discharged from a battery is then corrected according to the limited variation of the amount of power to be produced by the fuel cell unit 40, so as to meet the required system power output.

13 Claims, 9 Drawing Sheets

FOREIGN PATENT DOCUMENTS

| | | |
|---|---|---|
| JP | 01-211860 A | 8/1989 |
| JP | 02-126565 A | 5/1990 |
| JP | 03-025861 A | 2/1991 |
| JP | 8-33782 | 3/1996 |
| JP | 200-048845 A | 2/2000 |
| JP | 2004-111255 * | 4/2004 |
| JP | 2004-111255 A | 4/2004 |
| JP | 2004-172105 A | 6/2004 |
| JP | 2008-527648 A | 7/2008 |
| WO | 2006/073545 A1 | 7/2006 |

* cited by examiner

FUEL CELL APPARATUS, VEHICLE INCLUDING THE FUEL CELL APPARATUS, AND POWER MANAGEMENT METHOD FOR A SYSTEM EQUIPPED WITH FUEL CELL UNIT

This is a 371 national phase application of PCT/IB2006/001704 filed Jun. 19, 2006, which claims priority to Japanese Patent Application No. 2005-181223 filed Jun. 21, 2005, the contents of which are incorporated herein by reference.

BACKGROUND OF THE INVENTION

1. Field of the Invention

The present invention relates to a fuel cell apparatus that generates power using fuel gas containing hydrogen and oxidizing gas containing oxygen, and a vehicle including such a fuel cell apparatus. The present invention also relates to a power management method for a system equipped with a fuel cell unit.

2. Description of the Related Art

A known fuel cell apparatus, such as the one disclosed in Japanese Patent Application Publication No. JP08-33782, has proton-conductive solid polymer electrolyte membranes in the electrolyte layers of the fuel cells. To facilitate electrochemical reactions of the fuel cells, carbon particles carrying platinum thereon, which are catalyst, are applied to the surface of each of the solid polymer electrolyte membranes. Such catalyst will hereinafter be referred to as "Pt catalyst".

FIG. 12 is a graph showing the relationship between the oxidization-reduction potential of Pt catalyst and the output voltage of a fuel cell unit. The oxidization-reduction potential in the graph collectively represents the electric potential where oxidization of the Pt catalyst is induced, which, for example, forms an oxide film on the Pt catalyst, and that where reduction of the oxidized catalyst is induced. The "OCV" represents the open-current voltage of a fuel cell apparatus, the output voltage where no load is connected to the fuel cell apparatus, i.e., no current is supplied from the fuel cell apparatus. As shown in the graph, the open-current voltage of the fuel cell apparatus is higher than the oxidization-reduction potential of Pt catalyst that is shown by the dotted line.

In a system equipped with such a fuel cell apparatus, the region where power generation of the fuel cell apparatus is carried out frequently switches between the low potential side and the high potential side in response to, for example, changes in the amount of power required by the system. Such frequent switching of the power generation region, however, induces reduction and oxidization on the surface of the Pt catalyst, as indicated by Formula (1) and (2) below.

$$Pt+2H_2O \rightarrow Pt(OH)_2+2H^++2e^- \quad (1)$$

$$Pt(OH)_2+2H^++2e^- \rightarrow Pt+2H_2O \quad (2)$$

Repetition of such oxidation and reduction causes sintering of Pt catalyst which leads to reduced power generation performance of the fuel cell apparatus.

SUMMARY OF THE INVENTION

It is an object of the invention to provide a technology that suppresses sintering to minimize a decrease in the power generation performance of a fuel cell unit.

A first aspect of the invention relates to a fuel cell apparatus including a rechargeable power storage device, a fuel cell unit including a fuel cell having a catalyst, a controller that controls charging and discharging of the rechargeable power storage device and power generation of the fuel cell unit in accordance with a required system power output. The controller limits variation of the amount of power to be produced by the fuel cell unit in accordance with a relationship between an output voltage of the full cell unit and an oxidization-reduction potential of the catalyst, and the controller increases the amount of power to be used to charge or discharged from the rechargeable power storage device according to the limited variation of the amount of power to be produced by the fuel cell unit, so as to meet the required system power output.

According to this construction, because variation of the amount of power to be produced by the fuel cell unit is limited in accordance with the relationship between the output voltage of the fuel cell unit and the oxidization-reduction potential of the catalyst (e.g., in response to the output voltage becoming close to the oxidization-reduction potential) and the amount of power to be used to charge or discharged from the rechargeable power storage is then corrected to meet the required system power output, it reduces the changes of the output voltage of the fuel cell unit changing across the oxidization-reduction potential of the catalyst, regardless of changes in the required system power output. Thus, it is possible to suppress sintering of the catalyst and thereby avoid a decrease in the power generation performance of the fuel cell unit. The "oxidization-reduction potential" includes, as well as a potential at or around which at least one of oxidization and reduction of the catalyst is induced, a predetermined potential associated with that oxidization/reduction inducing potential (e.g., a control potential set close to an oxidization inducing potential).

In the foregoing fuel cell apparatus, the controller may be configured to perform the limiting of the variation of the amount of power to be produced by the fuel cell unit when the output voltage of the fuel cell unit becomes close to the oxidization-reduction potential of the catalyst, and to increase the amount of power to be used to charge or discharged from the rechargeable power storage device in accordance with the limited variation of the amount of power to be produced by the fuel cell unit, so as to meet the required system power output.

In the foregoing fuel cell apparatus, the controller may be configured to continue or repeat the limiting of the variation of the amount of power to be produced by the fuel cell unit until a parameter indicating a charge state of the rechargeable power storage device reaches a reference charge level.

In the foregoing fuel cell apparatus, the controller may be configured to perform the limiting of the variation of the amount of power to be produced by the fuel cell unit, in response to the output voltage of the fuel cell unit decreasing down to a level close to the oxidization-reduction potential of the catalyst.

In the foregoing fuel cell apparatus, the controller may be configured to set a maximum duration of the limiting of the variation of the amount of power to be produced by the fuel cell unit, and continue or repeat said limiting within the set maximum duration.

In the foregoing fuel cell apparatus, the controller may be configured to detect a charge state of the rechargeable power storage device and change the maximum duration in accordance with the detected charge state.

In the foregoing fuel cell apparatus, the controller is configured to count a number of times that the required system power output changes or the fuel cell unit performs power generation within a predetermined period of time, and change the maximum duration in accordance with the counted number of times.

In the foregoing fuel cell apparatus, the controller may be configured to detect a pH of exhaust gas discharged from the fuel cell unit and adjust an output voltage level of the fuel cell unit at or around which the controller performs the limiting of the variation of the amount of power to be produced by the fuel cell unit, in accordance with the detected pH.

In the foregoing fuel cell apparatus, the controller may be configured to detect a state of power generation of the fuel cell unit, and adjust an output voltage level of the fuel cell unit at or around which the controller performs the limiting of the variation of the power to be produced by the fuel cell unit, in accordance with the detected state.

In the foregoing fuel cell apparatus, the controller may be configured to make a power allocation between the fuel cell unit and the rechargeable power storage device to meet the required system power output, and if an amount of the power allocated to the fuel cell unit is below an oxidization-reduction power level that is associated with the oxidization-reduction potential of the catalyst, the controller may make the power allocation so as to meet the required system power output with the power discharged from the rechargeable power storage alone.

The foregoing fuel cell apparatus may be provided in a vehicle. In this case, the controller may be configured to count a number of times that the vehicle accelerates and/or decelerates within a predetermined period of time and change the maximum duration in accordance with the counted number of times.

The foregoing fuel cell apparatus may be provided in a vehicle that runs on a road. In this case, the controller may be configured to determine a state or characteristic of the road on which the vehicle is running, and to change the maximum duration in accordance with the detected state or characteristic of the road.

The foregoing fuel cell apparatus may be provided in a vehicle. In this case, the controller may be configured to detect a speed of the vehicle and adjust an output voltage level of the fuel cell unit at or around which the controller performs the limiting of the variation of the power to be produced by the fuel cell unit, in accordance with the detected speed.

A second aspect of the invention relates to a power management method for a system equipped with a fuel cell unit and a rechargeable power storage device that are used to meet a required system power output, including: determining the required system power output; determining an amount of power to be produced by a fuel cell unit and an amount of power to be used to charge or discharged from a rechargeable power storage, in accordance with the required system power output; correcting the determined amount of power to be produced by the fuel cell unit based on a relationship between an output voltage of the full cell unit and an oxidization-reduction potential of a catalyst of a fuel cell of the fuel cell unit; and correcting the determined amount of power to be used to charge or discharged from the rechargeable power storage in accordance with the corrected amount of power to be produced by the fuel cell unit.

In the foregoing method, the correction of the determined amount of power to be produced by the fuel cell unit may include: determining whether the output voltage of the fuel cell unit is close to the oxidization-reduction potential of the catalyst, and correcting the amount of power to be produced by the fuel cell unit if the output voltage of the fuel cell unit is close to the oxidization-reduction potential.

The foregoing method may further include: determining if a charge level of the rechargeable power storage device has reached a reference charge level; and stopping making the correction of the amount of power to be produced by the fuel cell unit if the charge level has reached the reference charge level.

The foregoing method may further include: determining whether the correction of the amount of power to be produced by the fuel cell unit has been continued or repeated for a maximum duration; and stopping making the correction of the amount of power to be produced by the fuel cell unit if said correction has been continued or repeated for the maximum duration.

The foregoing method may further include: detecting a charge state of the rechargeable power storage device; and changing the maximum duration in accordance with the detected charge state.

The foregoing method may further include: counting a number of times that the required system power output changes or the fuel cell unit performs power generation within a predetermined period of time; and changing the maximum duration in accordance with the counted number of times.

The foregoing method may further include: detecting a pH of exhaust gas discharged from the fuel cell unit; and adjusting an output voltage level of the fuel cell unit at or around which the correction of the amount of power to be produced by the fuel cell unit is made, in accordance with the detected pH.

The foregoing method may further include: detecting a state of power generation of the fuel cell unit; and adjusting an output voltage level of the fuel cell unit at or around which the correction of the amount of power to be produced by the fuel cell unit is made, in accordance with the detected state.

In the foregoing method, if the determined amount of power to be produced by the fuel cell unit is smaller than an oxidization-reduction power level that is associated with the oxidization-reduction potential of the catalyst, the amount of power to be produced by the fuel cell unit may be zeroed by the correction thereof, and the amount of power to be discharged from the rechargeable power storage device may be increased by the correction thereof so as to satisfy the required system power output.

In the foregoing method, the system may be a fuel cell apparatus provided in a vehicle, and the method may further include: counting a number of times that the vehicle accelerates and/or decelerates within a predetermined period of time; and changing the maximum duration in accordance with the counted number of times.

In the foregoing method, the system may be a fuel cell apparatus provided in a vehicle that is configured to run on a road, and the method may further include: determining a state or characteristic of the road on which the vehicle is running; and changing the maximum duration in accordance with the detected state or characteristic of the road.

In the foregoing method, the system may be a fuel cell apparatus provided in a vehicle, and the method may further include: detecting a speed of the vehicle; and adjusting an output voltage of the fuel cell unit at or around which the correction of the amount of power to be produced by the fuel cell unit is made, in accordance with the detected speed.

According to the above-described fuel cell apparatus, power management method, and vehicles incorporating the apparatus and/or method, sintering of catalyst of a fuel cell of fuel cell unit can be reliably suppressed, whereby a decrease in the performance of power generation by the fuel cell unit can be avoided.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

Figure 1:
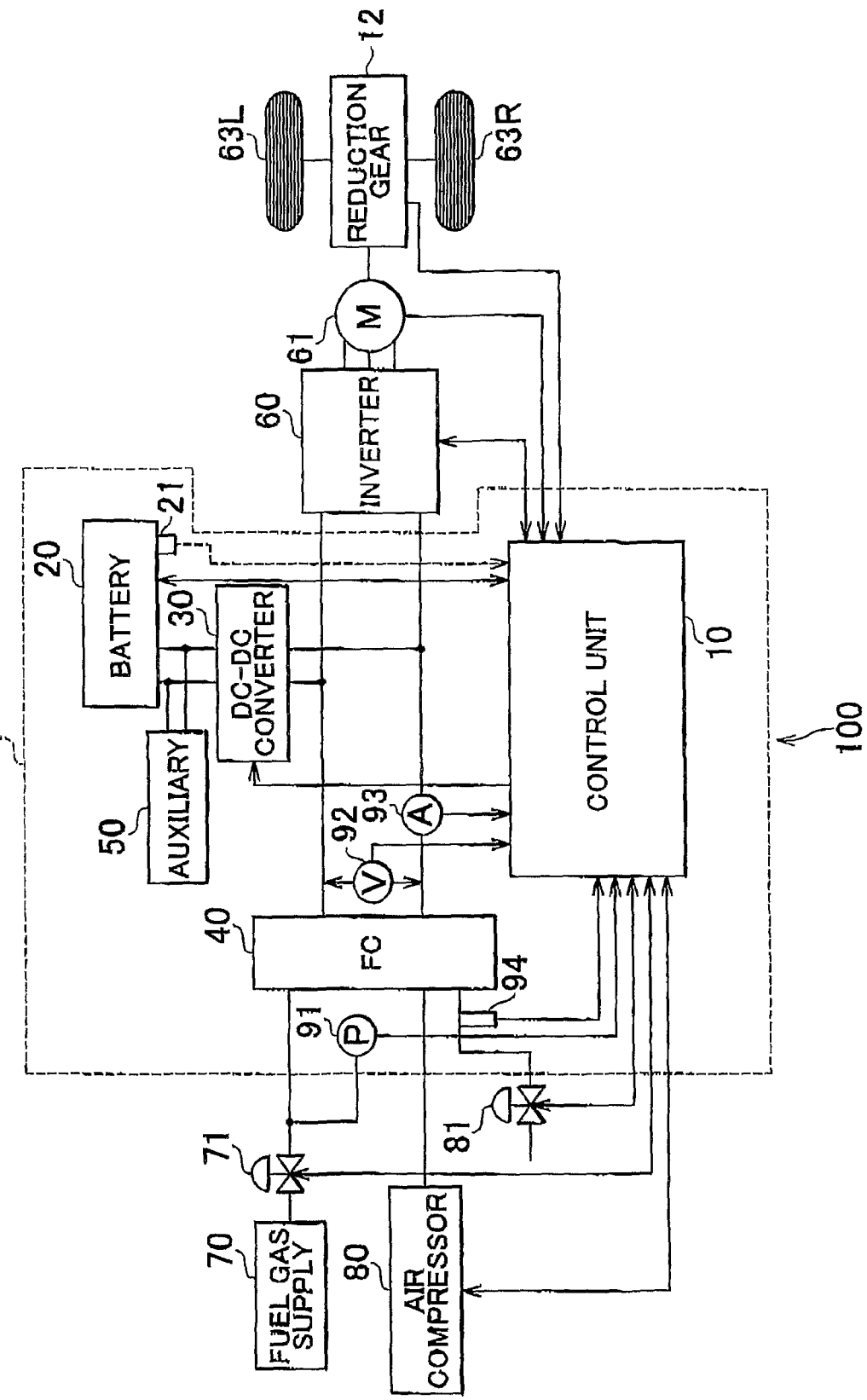
FIG. 1 is a view schematically showing a configuration that incorporates a fuel cell apparatus according to an exemplary embodiment of the invention.

Hereinafter, exemplary embodiments of the invention will be described with reference to the accompanying drawings. FIG. 1 schematically shows a configuration of a fuel cell hybrid car that incorporates a fuel cell apparatus 100 according to an exemplary embodiment. Although, in this exemplary embodiment, the invention is applied to a fuel cell hybrid car (FCHV), it may instead be applied to various other cars (e.g., electric cars and hybrid cars), various other vehicles (e.g., ships, airplanes), various stationary power supply apparatuses, and so on.

The fuel cell hybrid car shown in FIG. 1 is propelled by a synchronous motor 61 that is connected to wheels 63L, 63R via a reduction gear 12. The synchronous motor 61 is powered by a power supply system 1. Specifically, the direct current supplied from the power supply system 1 is converted by an inverter 60 into three-phase alternating current and then is supplied to the synchronous motor 61. The synchronous motor 61 is also used as a power generator during braking, for example.

The power supply system 1 includes a fuel cell unit 40, battery 20, and DC/DC converter 30. The fuel cell unit 40 has a stack structure where cells are stacked in series on the top of the other. The fuel cell unit 40 produces power using fuel gas and oxidizing gas. In the fuel cell unit 40, proton conductive solid polymer electrolyte membranes are provided in the electrolyte layers of the fuel cells, and Pt catalyst is applied to the surface of each of those membranes. If appropriate, the Pt catalyst may be replaced with other catalyst including, but not limited to, platinum-cobalt catalyst.

A fuel gas supply (e.g., hydrogen tank) 70 supplies fuel gas containing hydrogen to the anodes of the fuel cells of the fuel cell unit 40, and an air compressor 80 supplies oxidizing gas containing oxygen to the cathodes.

The battery 20 is a rechargeable secondary battery including, but not limited to, a nickel hydride battery. However, various other batteries can be used as the battery 20. Further, the battery 20 is not limited to such secondary batteries, but may be replaced with other power storage devices, such as a capacitor. The battery 20 is connected to the output lines (power discharge lines) of the fuel cell unit 40, so that they are connected in parallel to each other.

The battery 20 and the fuel cell unit 40 are connected in parallel to the inverter 60. Between the fuel cell unit 40 and the inverter 60, diodes, not shown in the drawings, are provided to prevent reverse current from the battery 20 and the synchronous motor 61 as the power generator.

A DC-DC converter 30 is a DC voltage converter that adjusts DC voltage from the battery 20 and outputs it to the fuel cell unit 40 side and adjusts DC voltage from the synchronous motor 61 and outputs it to the battery 20 side. Owing to these functions of the DC-DC converter 30, the battery 20 can be properly charged and discharged.

An auxiliary 50 is connected between the battery 20 and the DC-DC converter 30 and is powered by the battery 20. The auxiliary 50 includes various electric and electronic devices that are used, for example, during the operation of the fuel cell hybrid car. Examples of the devices include lights, air-conditioner, and hydraulic pumps.

Various components of the fuel cell hybrid car, including those described above, are controlled by a control unit 10 that is a microcomputer including a CPU, ROM, RAM, etc. In operation, the control unit 10 receives various sensor inputs indicating necessary parameters, such as: (a) fuel gas supply pressure detected by a pressure sensor 91; (b) output voltage Vfc of the fuel cell unit 40 detected by a voltage sensor 92; (c) output current Ifc of the fuel cell unit 40 detected by a current sensor 93; (d) pH of the cathodes of the fuel cells detected by a pH sensor 94; and (e) an SOC (State Of Charge) value corresponding to the charge state of the battery 20 detected by an SOC sensor 21. Using these sensor inputs, the control unit 10 controls the respective components of the fuel cell hybrid car, such as a regulator valve 71 provided in a fuel gas passage, a regulator valve 81 provided in an oxidizing gas passage, the air compressor 80, the battery 20, the DC-DC converter 30, and the inverter 60. In order to suppress sintering of the Pt catalyst, the control unit 10 executes various controls, which will be described later, to minimize the changes of the output power of the fuel cell unit 40 changing across an oxidization-reduction power level that is associated with an oxidization-reduction potential of the Pt catalyst.

Figure 2:
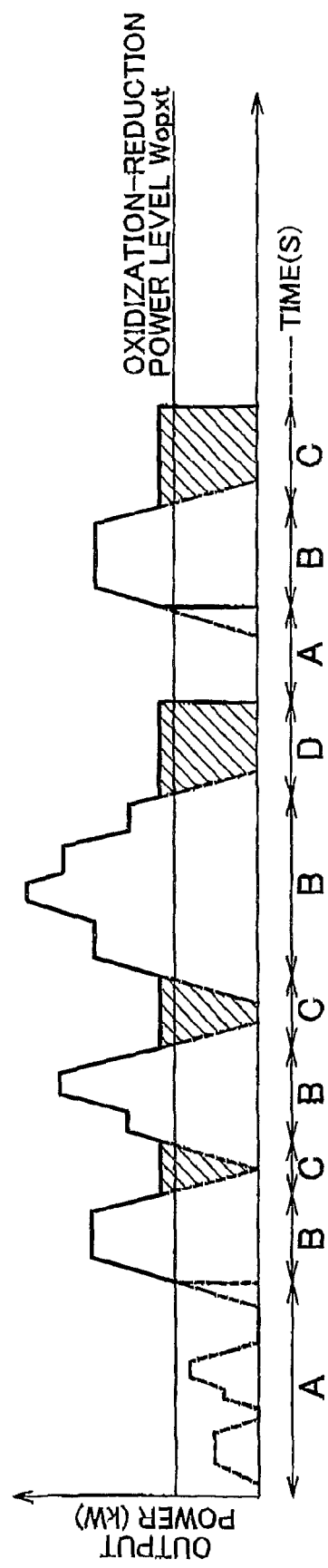
FIG. 2 is a control chart illustrating an control logic employed in the exemplary embodiment to suppress sintering of Pt catalyst.
Figure 3:
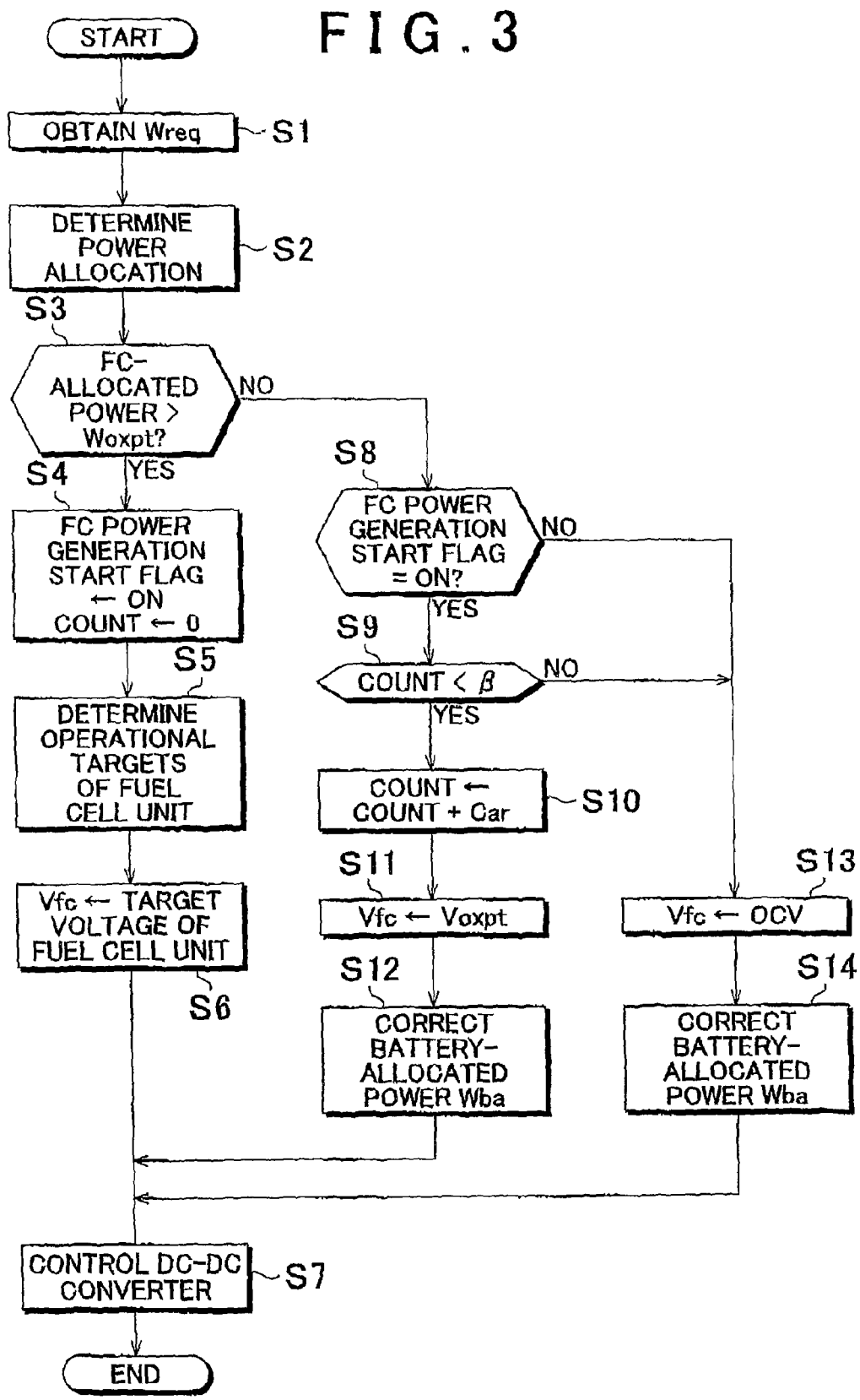
FIG. 3 is a flowchart showing an exemplary control routine to implement the control logic in FIG. 2.

FIG. 2 is a control chart illustrating a control logic employed in this exemplary embodiment to suppress sintering of the Pt catalyst. FIG. 3 is a flowchart showing an exemplary control routine to implement the control logic illustrated in FIG. 2. In FIG. 2, the vertical axis represents the output power of the fuel cell unit 40 and the horizontal axis represents time. The control routine of FIG. 3 is repeatedly executed by the control unit 10.

When the routine starts, the control unit 10 obtains, in step 1, the amount of required system power Wreq based on, for example, signals from an accelerator sensor, a running speed sensor, and a sensor for detecting the operation state of the auxiliary 50. Then, the control unit 10 proceeds to step 2 and determines allocation of power to be produced by the fuel cell unit 40 and power to be used to charge or discharged from the battery 20, respectively, so as to meet the required system power Wreq. This allocation is made based on the output limit (e.g., maximum output per unit time) of the fuel cell unit 40, the upper input and output limits of the battery 20, and so on.

In step 3, the control unit 10 determines whether the amount of power allocated to the fuel cell unit 40 (will be referred to as "FC-allocated power") is greater than an oxidization-reduction power level Woxpt that is associated with an oxidization-reduction potential Voxpt of the Pt catalyst. The oxidization-reduction potential Voxpt is a control potential (e.g., 0.7V) that is set between the potential that induces oxidization of the Pt catalyst (e.g., 0.78V) and the potential that induces reduction of the oxidized Pt catalyst (e.g. 0.6V). Because the oxidization and reduction inducing potentials vary depending upon the internal temperature of the fuel cell unit 40, the supply pressure of fuel gas, and so on, the oxidization-reduction potential Voxpt may include a tolerance γ and the oxidization-reduction power level Woxpt may include a tolerance α.

If the amount of FC-allocated power is below the oxidization-reduction power level Woxpt (See "A" in FIG. 2), the control unit 10 proceeds to step 8 and determines whether an FC power generation start flag, which is stored in the control unit 10, is on or off. The flag indicates whether the fuel cell unit 40 has started power generation and remains off until the fuel cell unit 40 starts power generation. If the FC power generation start flag is off, the control unit 10 proceeds to step 13 and sets the output voltage Vfc of the fuel cell unit 40 to the open-current voltage (OCV) so that the output power Wfc of the fuel cell unit 40 becomes zero. That is, because power is a product of voltage and current, setting the output voltage Vfc to the open-current voltage (OCV) zeros the output power Wfc of the fuel cell unit 40. Subsequently, the control unit 10 proceeds to step 14 and corrects the amount of power allocated to the battery 20 (will be refereed to as "battery allocated power") which has been determined in step 2, so as to compensate for the zeroed output power Wfc of the fuel cell unit 40, i.e., to satisfy the required system power Wreq with the battery 20 alone. Finally, the control unit 10 proceeds to step 7 and controls the DC-DC converter 30 to supply the corrected battery allocated power from the battery 20, after which the routine ends.

When it is determined in step 3 of a subsequent cycle of the routine that the amount of FC-allocated power is (has become) greater than the oxidization-reduction power level Woxpt (See "B" in FIG. 2), the control unit 10 proceeds to step 4. In this step, the control unit 10 sets the FC power generation start flag to "on" and clears a counter provided in the control unit 10, not shown in the drawings (counter=0). Then, the control unit 10 proceeds to step 5 and determines operational targets (target voltage, target current) of the fuel cell unit 40 in accordance with the amount of FC-allocated power determined in step 2. Detail of this process will be described below.

Figure 4:
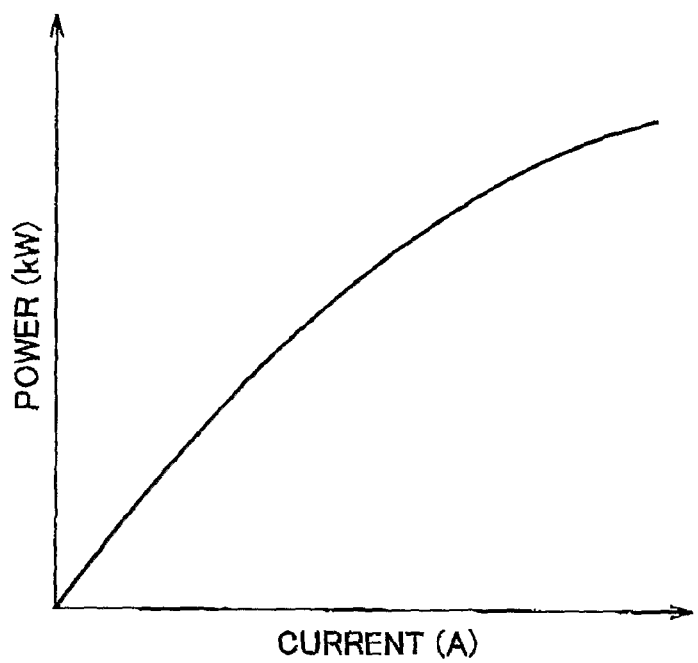
FIG. 4 is a power-current characteristic map employed in the exemplary embodiment.
Figure 5:
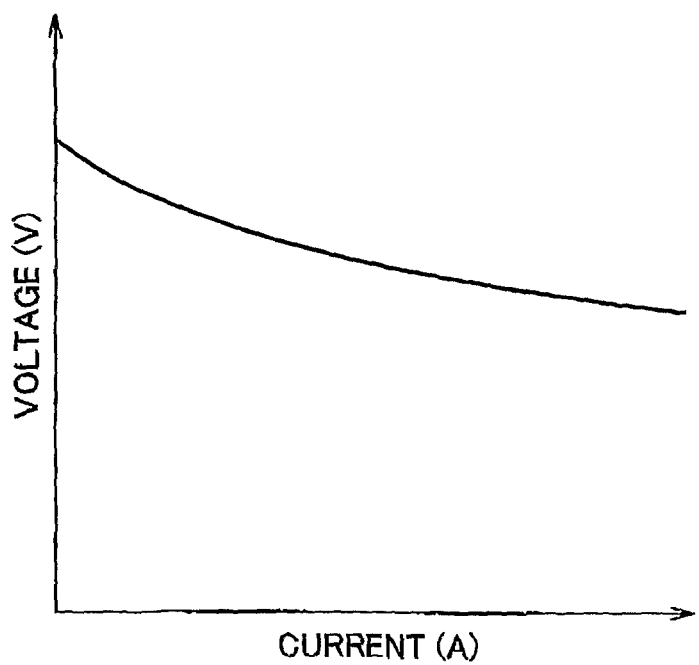
FIG. 5 is a voltage-current characteristic map employed in the exemplary embodiment.

A power-current characteristic map as shown in FIG. 4 and a voltage-current characteristic map as shown in FIG. 5 are stored in the memory of the control unit 10. In step 5, the control unit 10 sets the target output current of the fuel cell unit 40 to a value corresponding to the amount of FC-allocated power by referring to the power-current characteristic map, and then sets the target output voltage of the fuel cell unit 40 to a value corresponding to the target current by referring to the voltage-current characteristic map. Then, with these operational targets thus set, the control unit 10 controls the DC-DC converter 30 so as to bring the output voltage Vfc of the fuel cell unit 40 to the target output voltage (Step 6, Step 7).

When it is determined in step 3 of a subsequent cycle of the routine that the amount of FC-allocated power is (has become) less than the oxidization-reduction power level Woxpt (See "C" in FIG. 2), the control unit 10 then proceeds to step 8 and determines whether the FC power generation start flag is on or off. Because the flag has already been set to "on" as described above (i.e. the power generation of the fuel cell unit 40 has already started), the control unit 10 determines "YES" and proceeds to step 9. In step 9, the control unit 10 determines whether the present count of the counter is less than a threshold value β that corresponds to the maximum duration for limiting the amount of power to be produced from the fuel cell unit 40. The threshold value β is set to a fixed value in advance, for example, during production of the fuel cell hybrid car. But it may instead be a value that varies depending on some conditions, as will be described in detail later.

If the present count of the counter is less than the threshold value β (step 9: YES), the control unit 10 then advances the counter by a one-cycle value Car that corresponds to the time necessary for executing a cycle of the routine, and sets the output voltage Vfc of the fuel cell unit 40 to the oxidization-reduction potential Voxpt (steps S10, S11). Then, the control unit 10 corrects the amount of battery allocated power in step 12, so as to compensate for the variation of the amount of output power Wfc of the fuel cell unit 40 resulting from the output voltage Vfc being set to the oxidization-reduction potential Voxpt. Finally, in step 7, the control unit 10 controls the DC-DC converter 30 to supply the corrected battery-allocated power from the battery 20 and produce the output power Wfc from the fuel cell unit 40.

When the count of the counter exceeds the threshold value β after the foregoing processes have been repeated a certain number of times (step 9: NO), the control unit 10 then proceeds to step 13 and reduces the output voltage Vfc of the fuel cell unit 40 to the open-current voltage (OCV) (see "D" in FIG. 2). Next, in step 14, the control unit 10 corrects the amount of battery-allocated power so as to compensate for the reduction of the output voltage Vfc of the fuel cell unit 40. Finally, in step 7, the control unit 10 controls the DC-DC converter 30 so as to supply the corrected battery-allocated power from the batter 20, after which the routine ends.

By these processes, the fuel cell apparatus of this exemplary embodiment can minimize the changes of the output voltage of the fuel cell unit changing across the oxidization-reduction potential, regardless of changes in the amount of required system power which occur in response to the accelerator pedal being stepped on or off, or depending upon some other conditions. Thus, it is possible to suppress sintering of the Pt catalyst and thereby avoid a decrease in the power generation performance of the fuel cell unit 40.

OTHER EXAMPLES

The following are several examples of modifications to the fuel cell apparatus described above. The first two examples refer to exemplary cases where the threshold value β, which corresponds to the maximum duration that power generation of the fuel cell unit 40 continues and is made a fixed value in the foregoing exemplary embodiment, varies depending on particular conditions.

First Example

Figure 6:
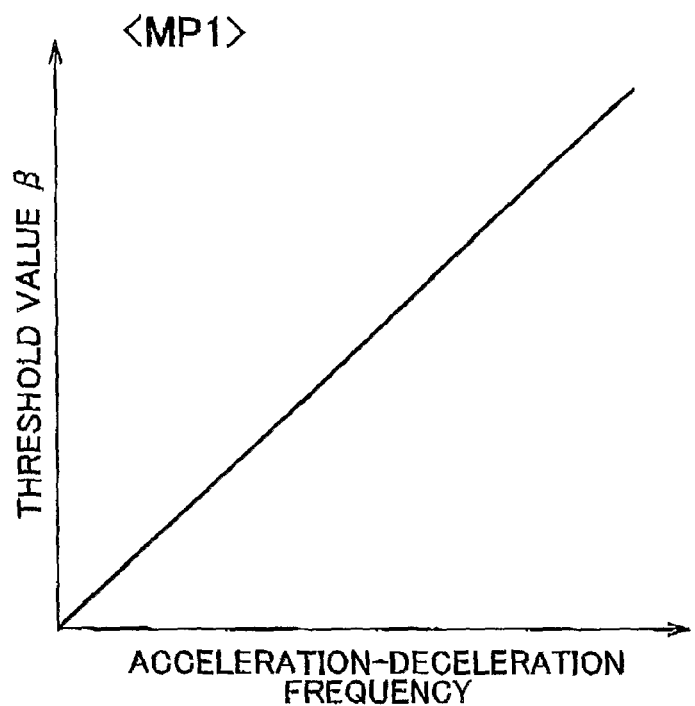
FIG. 6 is a map used to determine a threshold value (First modification example)

A map MP1 of FIG. 6 illustrates an example where the threshold value β changes according to the number of times that the accelerator is turned on and off, i.e., the frequency of acceleration and deceleration of the fuel cell hybrid car. More specifically, in this example, the control unit 10 counts said frequency over a particular period of time, and changes the threshold value β according to the counted frequency. When it is found that the fuel cell hybrid car has been accelerated and decelerated many times, it is highly likely that, for example, the fuel cell hybrid car will be accelerated again. When only a small number of times, conversely, the likelihood is low.

In view of this, the map MP1 is formulated such that the threshold value β increases as the foregoing acceleration-deceleration frequency over the particular period of time increases. The map MP1 is stored in a memory, or the like, and is used to minimize the time that the power generation of the fuel cell unit 40 continues to avoid decreases in the fuel economy and the efficiency of power regeneration using regenerative drive power, and so on. Note that, instead of the acceleration-deceleration frequency, the number of times that a brake switch is turned on and off, the amount of required system power Wreq changes, or the fuel cell unit 40 performs power generation, may be counted, and the threshold value β may be changed according to the counted number of times.

Second Example

Figure 7:
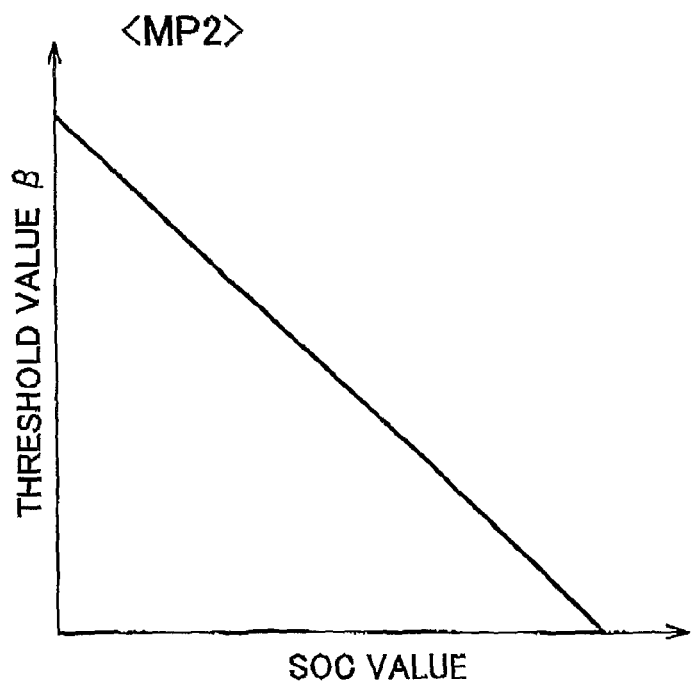
FIG. 7 is a map used to determine the threshold value (Second modification example)

A map MP2 of FIG. 7 illustrates an example where the threshold value β changes in accordance with the charge state of the battery 20. Specifically, the control unit 10 obtains an SOC (State-Of-Charge) value indicating the charge state of the battery 20, and changes the threshold value β according to the obtained SOC value. When the SOC value is small, it shows that the battery 20 can store a large amount of excess power. When the SOC value is large, conversely, it shows that the storable amount of excess power is not so large. In view of this, the map MP2 is formulated such that the threshold value β decreases as the SOC value increases. The map MP2 is stored in a memory, or the like, and is used to minimize the time that power generation of the fuel cell unit 40 continues, in order to avoid decreases in the fuel economy and the efficiency of power regeneration from regenerative drive power, and so on.

Further, if the fuel cell hybrid car, as one of applicable vehicles, is equipped with a navigation system, the threshold value β may be changed according to the state and/or characteristic of a road (e.g., road gradient, road type) that can be derived from the positional information obtained by the GPS receiver of the navigation system. For example, when the fuel cell hybrid car is running on an uphill road or highway, it is highly likely that the car will be accelerated again. In this case, therefore, the threshold value β is increased. When the fuel cell hybrid car is running on a downhill road or public road, conversely, the likelihood of re-acceleration is not so high, and therefore the threshold value β is decreased. Thus, the threshold value β can be desirably changed depending upon the state and/or characteristic of a road.

Third Example

Figure 8:
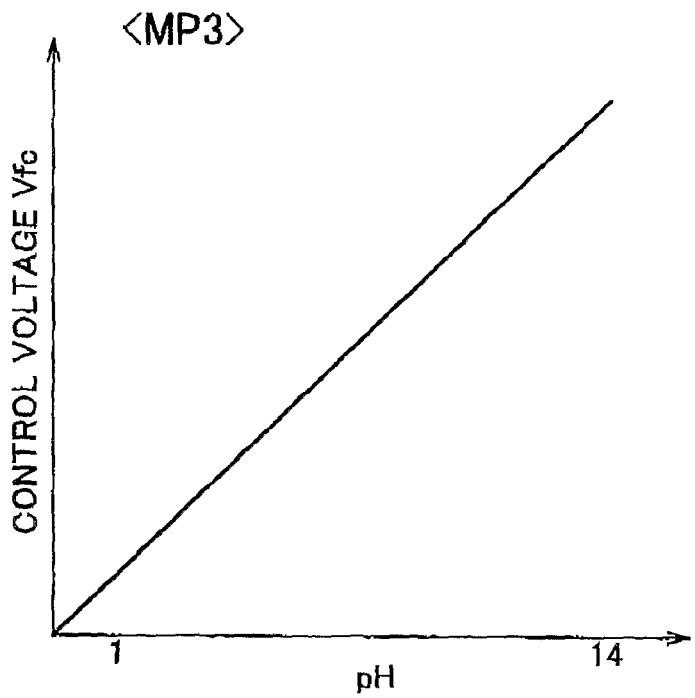
FIG. 8 is a map used to control an output voltage of the fuel cell unit (Third modification example)

A map MP3 of FIG. 8 illustrates an example where the output voltage Vfc, which is an output voltage of the fuel cell unit 40 during its power generation being limited, changes in accordance with the pH of the cathodes of the fuel cells that is detected by the pH sensor 94 (the output voltage Vfc will hereinafter be referred to as "control voltage Vfc"). This is because the oxidization-reduction potential Voxpt increases as the pH increases to the basic side, and decreases as the pH decreases to the acid side. In view of this, the map MP3 is formulated such that the control voltage Vfc of the fuel cell unit 40 increases as the pH increases. The map MP3 is stored in a memory, or the like, and is used to change the control voltage Vfc in order to more reliably prevent sintering of the Pt catalyst and avoid a decrease in the power generation performance of the fuel cell apparatus.

Fourth Example

Figure 9:
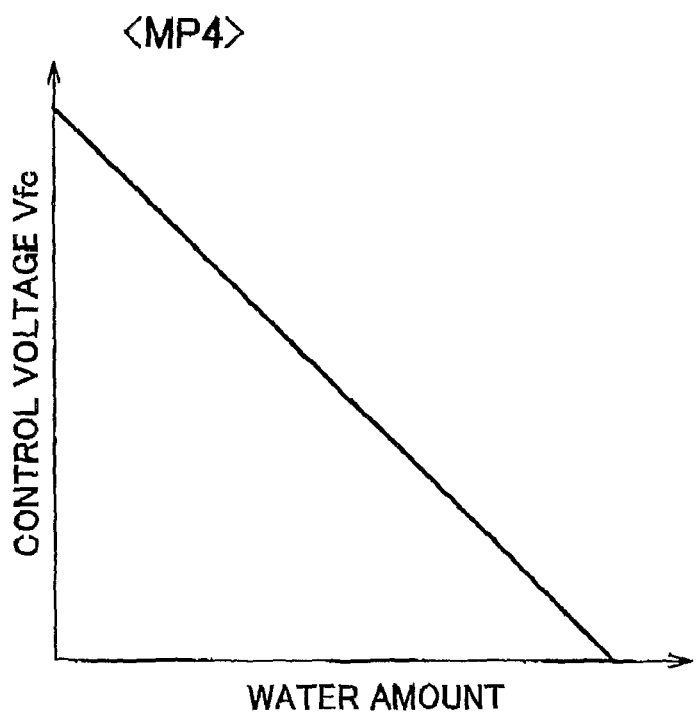
FIG. 9 is a map used to control an output voltage of the fuel cell unit (Fourth modification example)

A map MP4 of FIG. 9 illustrates an example where the control voltage Vfc of the fuel cell unit 40 changes depending upon the state of power generation by the fuel cell unit 40. When the fuel cell unit 40 continues to operate at a high output level, the amount of water produced at the cathode side of the fuel cell unit 40 increases, which lowers the oxidization-reduction potential Voxpt. When the fuel cell unit 40 continues to operate at a low output level, conversely, said amount of water decreases, which raises the oxidization-reduction potential Voxpt. In view of this, the map MP4 is formulated such that the control voltage Vfc of the fuel cell unit 40 decreases as the amount of water produced in the cathode side increases. The map MP4 is stored in a memory, or the like, and is used to more reliably prevent sintering of the Pt catalyst and avoid a decrease in the power generation performance of the fuel cell apparatus.

Fifth Example

Figure 10:
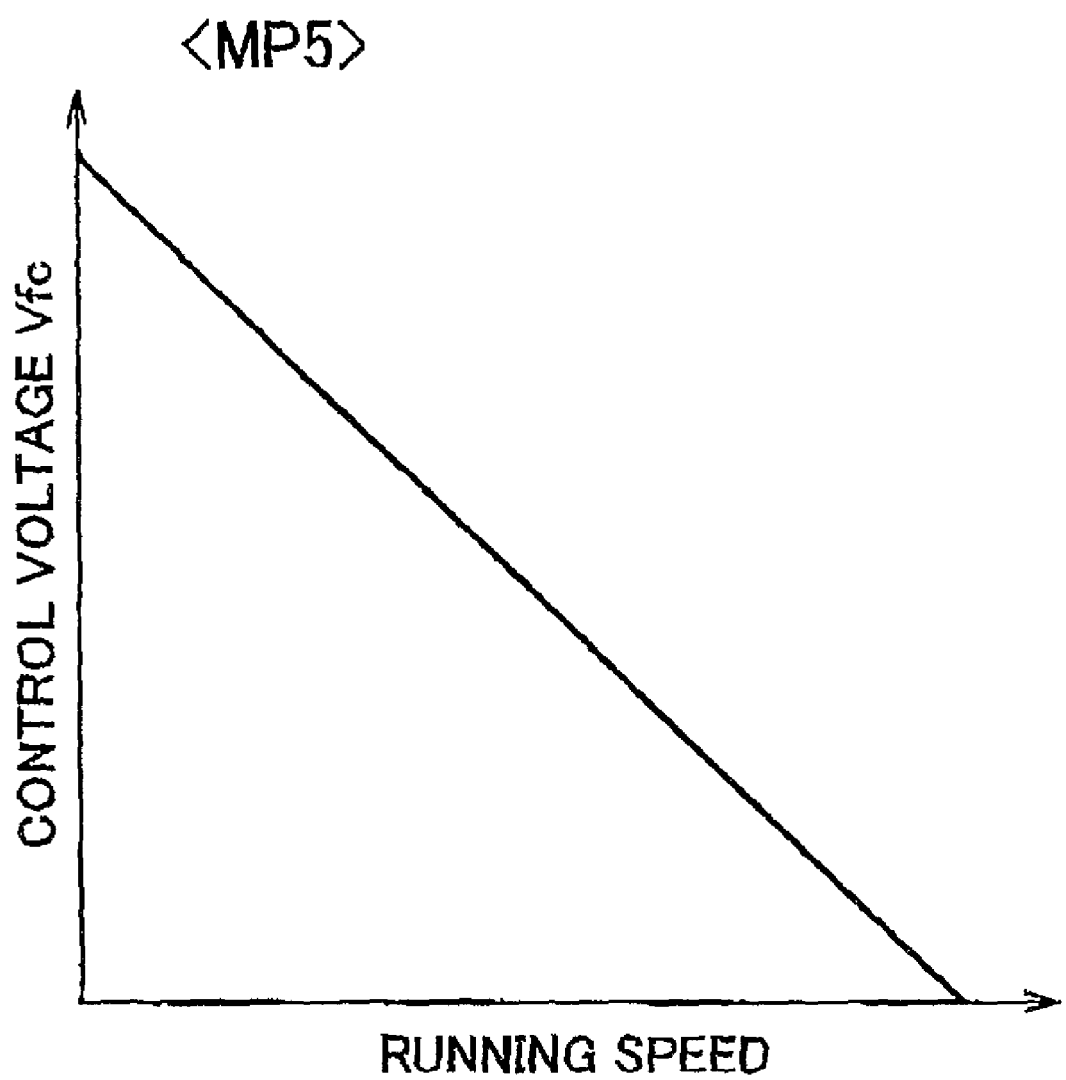
FIG. 10 is a map used to control an output voltage of the fuel cell unit (Fifth modification example)

A map MP5 of FIG. 10 illustrates an example where the control voltage Vfc of the fuel cell unit 40 changes in accordance with the running speed of the fuel cell hybrid car that is detected by a running speed sensor. When the fuel cell hybrid car is running at a high speed, the amount of regenerative drive power produced during braking tends to be large, and thus the amount of excess power. When the fuel cell hybrid car is running at a low speed, conversely, the amount of regenerative power tends to be small, and thus the amount of excess power. In view of this, the map MP5 is formulated such that the control voltage Vfc of the fuel cell unit 40 decreases as the running speed increases. The map MP5 is stored in a memory, or the like, and is used to change the control voltage Vfc in order to more reliably prevent sintering of the Pt catalyst and avoid a decrease in the power generation performance of the fuel cell apparatus.

Sixth Example

Figure 11:
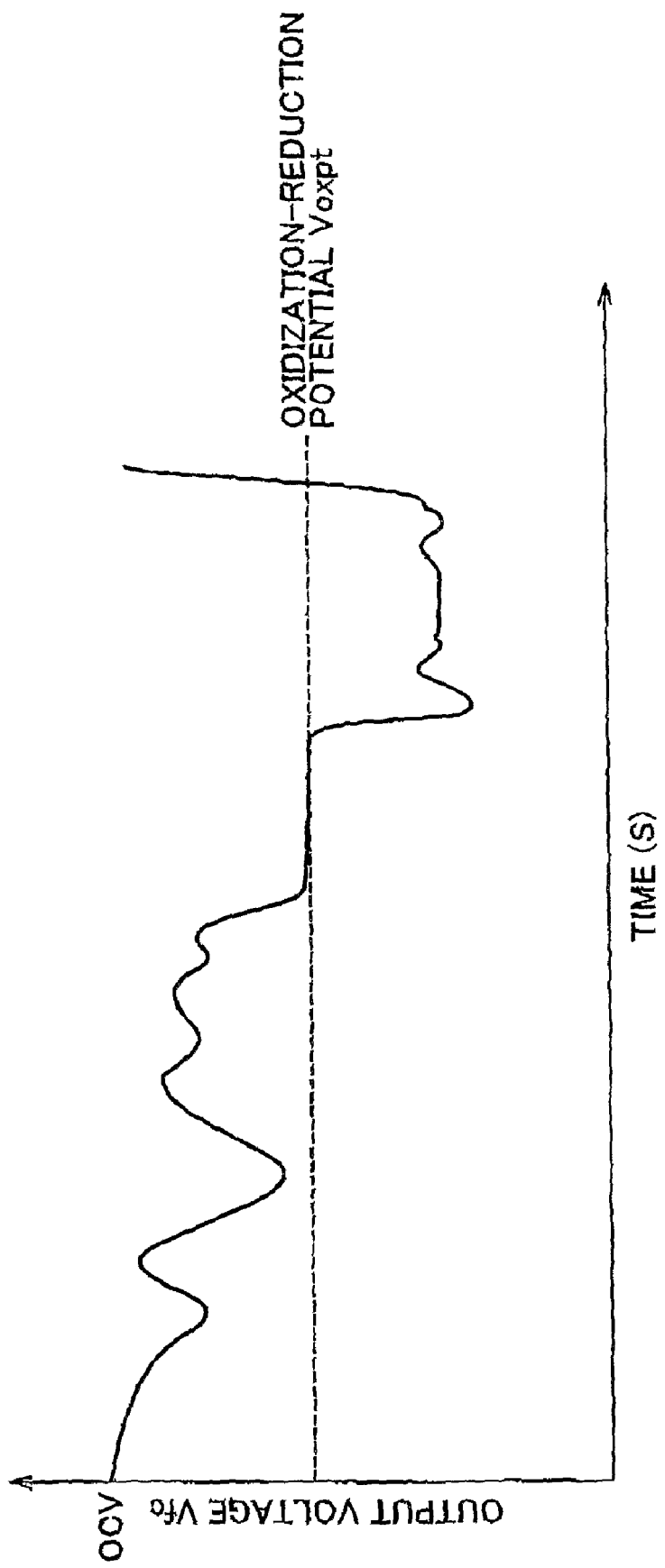
FIG. 11 is a graph showing variation of the output voltage of the fuel cell unit (Fifth modification example)
Figure 12:
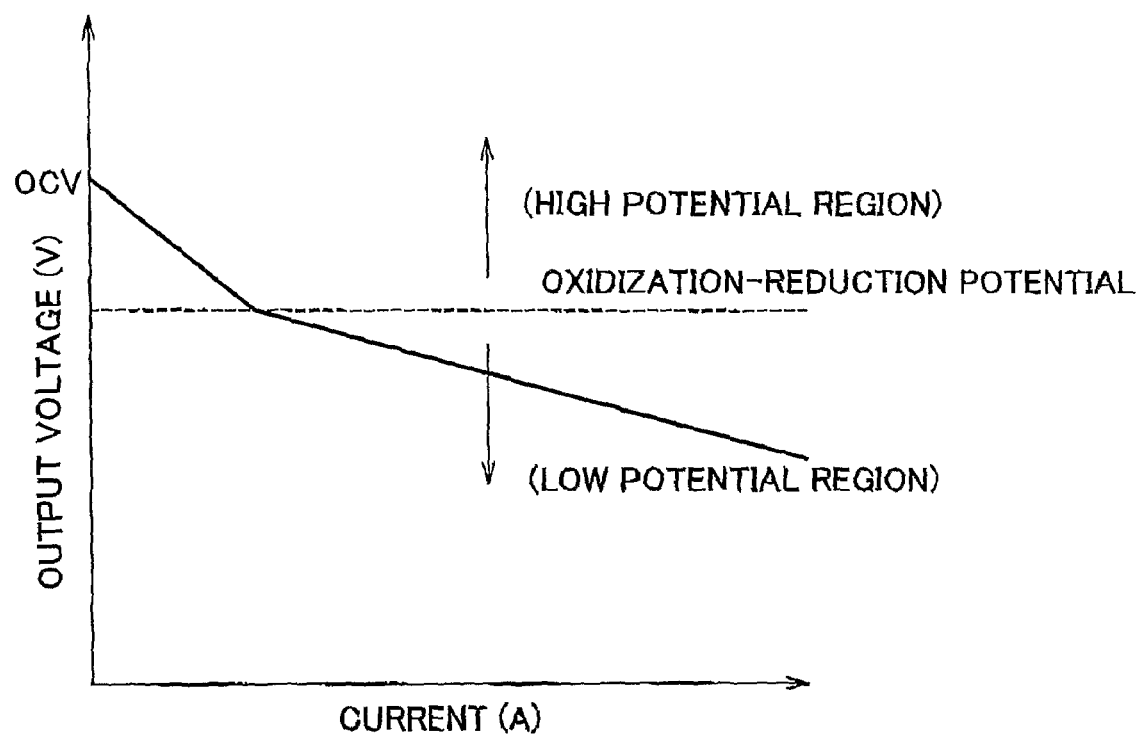
FIG. 12 is a graph showing the relationship between an oxidization-reduction potential and the output voltage of the fuel cell unit.

The graph of FIG. 11 shows variation of the output voltage Vfc of the fuel cell unit 40. Referring to the graph, when the output voltage of the fuel cell unit 40 is about to decrease below the oxidization-reduction potential Voxpt while the amount of required system power Wreq is gradually increasing in response to, for example, the accelerator being stepped down, the control unit 10 maintains the output voltage Vfc of the fuel cell unit 40 at the oxidization-reduction potential Voxpt (this limits variation in the amount of power to be produced by the fuel cell unit 40). When the output voltage Vfc is thus maintained at the oxidization-reduction potential Voxpt, rather than decreasing below that potential, the amount of output power of the fuel cell unit 40 can not increase to the required level. Therefore, the control unit 10 then increases the amount of power to be discharged from the battery 20 by an amount necessary to compensate for the limited amount of power of the fuel cell unit 40. The control unit 10 continues this power compensation until the SOC value of the battery 20 becomes lower than a first reference level (a first reference charge level). When the SOC value becomes lower than the first reference level, the control unit 10 reduces the output voltage Vfc of the fuel cell unit 40 below the oxidization-reduction potential Voxpt. Then, even if the accelerator pedal is stepped off and therefore the power generation of the fuel cell unit 40 becomes unnecessary, the control unit 10 continues the power generation of the fuel cell unit 40 while maintaining the output voltage Vfc below the oxidization-reduction potential Voxpt to charge the battery 20. The control unit 10 continues this battery charging until the SOC value of the battery 20 exceeds a second reference level (a second reference charge level). When the SOC value exceeds the second reference level, the control unit 10 increases the output voltage Vfc of the fuel cell unit 40 above the oxidization-reduction potential Voxpt. Thus, according to this example, it is possible to more reliably prevent sintering of the Pt catalyst and thereby avoid a decrease in the power generation performance of the fuel cell apparatus.

Seventh Example

While an excess of power produced by the fuel cell unit 40 is used to charge the battery 20 in the foregoing embodiment and examples, the excess power may instead be consumed to drive an electric load such as a coolant pump. Alternatively, the excess of power produced by the fuel cell unit 40 may be first used to charge the battery 20, and if some power is still left after charging the battery 20, it may be used to drive the electric load.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

The invention claimed is:

1. A fuel cell apparatus comprising:
   a rechargeable power storage device,
   a fuel cell unit including a fuel cell having a catalyst,
   a controller programmed to make a power allocation between the fuel cell unit and the rechargeable power storage device in accordance with a required system power output, and programmed to control charging and discharging of the rechargeable power storage device and power generation of the fuel cell unit,
   wherein the controller is further programmed to limit variation of an amount of power to be produced by the fuel cell unit, by charging the rechargeable power storage device with an excess of power produced by the fuel cell unit, when a state in which an amount of power allocated to the fuel cell unit is higher than an oxidization-reduction power level of the catalyst and the amount of power to be produced by the fuel cell unit is higher than the oxidization-reduction power level of the catalyst would change to a state in which the amount of power allocated to the fuel cell unit is lower than the oxidization-reduction power level of the catalyst, thereby reducing a chance of an output voltage of the fuel cell unit crossing below an oxidization-reduction potential of the catalyst.

2. The fuel cell apparatus according to claim 1, wherein the controller is programmed to perform the limiting of the variation of the amount of power to be produced by the fuel cell unit when the output voltage of the fuel cell unit becomes close to the oxidization-reduction potential of the catalyst, and to increase the amount of power to be used to charge or discharged from the rechargeable power storage device in accordance with the limited variation of the amount of power to be produced by the fuel cell unit, so as to meet the required system power output.

3. The fuel cell apparatus according to claim 2, wherein the controller is programmed to continue or repeat the limiting of the variation of the amount of power to be produced by the fuel cell unit until a parameter indicating a charge state of the rechargeable power storage device reaches a reference charge level.

4. The fuel cell apparatus according to claim 2, wherein the controller is programmed to perform the limiting of the variation of the amount of power to be produced by the fuel cell unit, in response to the output voltage of the fuel cell unit decreasing down to a level close to the oxidization-reduction potential of the catalyst.

5. The fuel cell apparatus according to claim 4, wherein the controller is programmed to set a maximum duration of the limiting of the variation of the amount of power to be produced by the fuel cell unit, and to continue or repeat said limiting within the set maximum duration.

6. The fuel cell apparatus according to claim 5, wherein the controller is programmed to detect a charge state of the rechargeable power storage device and change the maximum duration in accordance with the detected charge state.

7. The fuel cell apparatus according to claim 5, wherein the controller is programmed to count a number of times that the required system power output changes or the fuel cell unit performs power generation within a predetermined period of time, and to change the maximum duration in accordance with the counted number of times.

8. The fuel cell apparatus according to claim 1, wherein the controller is programmed to detect a pH of exhaust gas discharged from the fuel cell unit and adjust an output voltage level of the fuel cell unit at or around which the controller performs the limiting of the variation of the amount of power to be produced by the fuel cell unit, in accordance with the detected pH.

9. The fuel cell apparatus according to claim 1, wherein the controller is programmed to detect a state of power generation of the fuel cell unit, and to adjust an output voltage level of the fuel cell unit at or around which the controller performs the limiting of the variation of the power to be produced by the fuel cell unit, in accordance with the detected state.

10. The fuel cell apparatus according to claim 1, wherein the controller is programmed to make a power allocation between the fuel cell unit and the rechargeable power storage device to meet the required system power output, wherein
   if an amount of the power allocated to the fuel cell unit is below an oxidization-reduction power level that is associated with the oxidization-reduction potential of the catalyst, the controller is further programmed to make the power allocation so as to meet the required system power output with the power discharged from the rechargeable power storage alone.

11. A vehicle including the fuel cell apparatus according to claim 5, wherein
   the controller is programmed to count a number of times that the vehicle accelerates and/or decelerates within a predetermined period of time, and to change the maximum duration in accordance with the counted number of times.

12. A vehicle including the fuel cell apparatus according to claim 5, wherein
the vehicle is configured to run on a road, and
the controller is programmed to determine a state or characteristic of the road on which the vehicle is running, and change the maximum duration in accordance with the detected state or characteristic of the road.

13. A vehicle including the fuel cell apparatus according to claim 5, wherein
the controller is programmed to detect a speed of the vehicle and adjust an output voltage level of the fuel cell unit at or around which the controller performs the limiting of the variation of the power to be produced by the fuel cell unit, in accordance with the detected speed.

* * * * *

UNITED STATES PATENT AND TRADEMARK OFFICE
CERTIFICATE OF CORRECTION

PATENT NO. : 8,361,666 B2  Page 1 of 1
APPLICATION NO. : 11/920449
DATED : January 29, 2013
INVENTOR(S) : Hibino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1337 days.

Signed and Sealed this

First Day of September, 2015

Michelle K. Lee
*Director of the United States Patent and Trademark Office*